Patented Nov. 6, 1928.

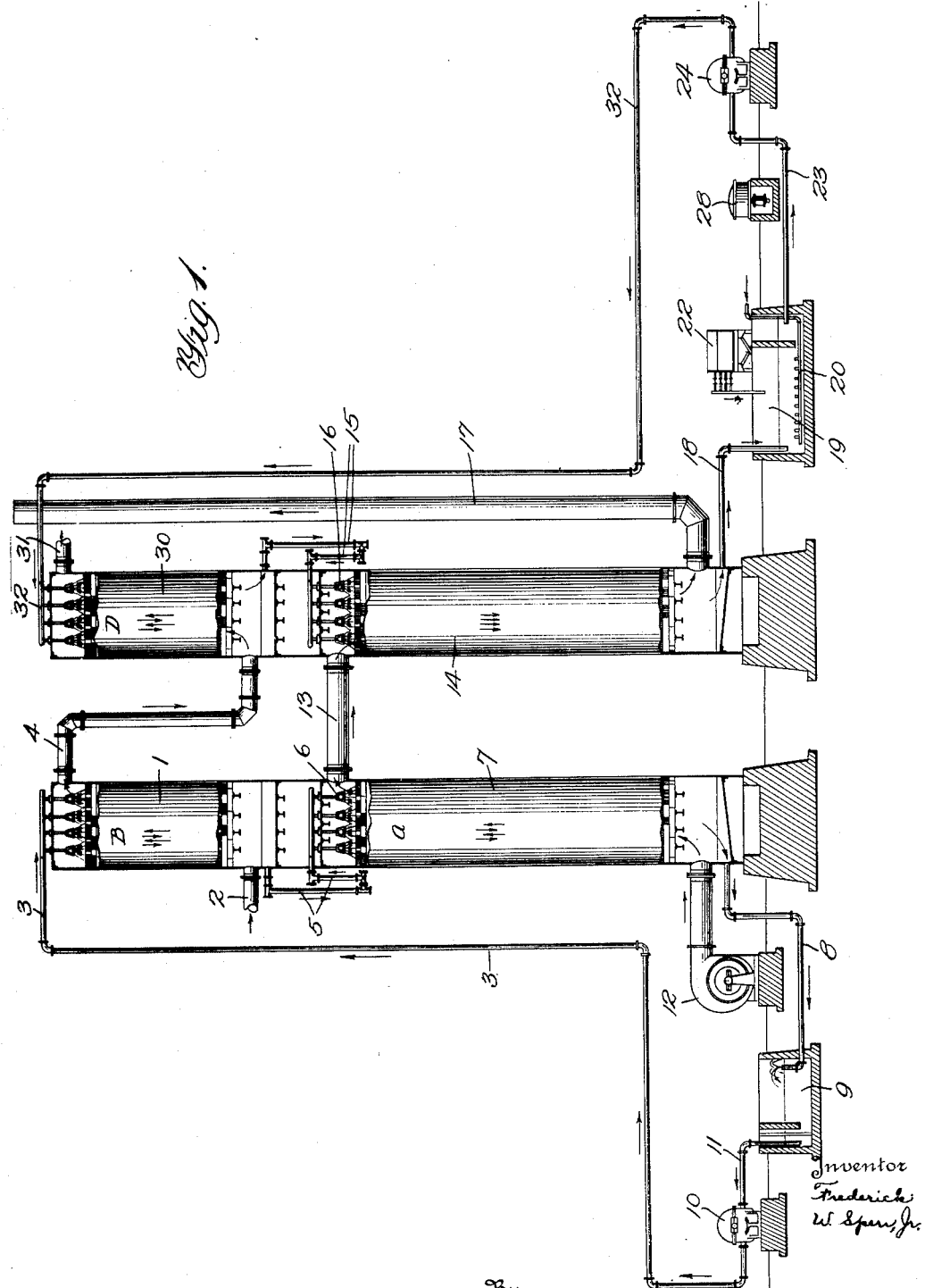

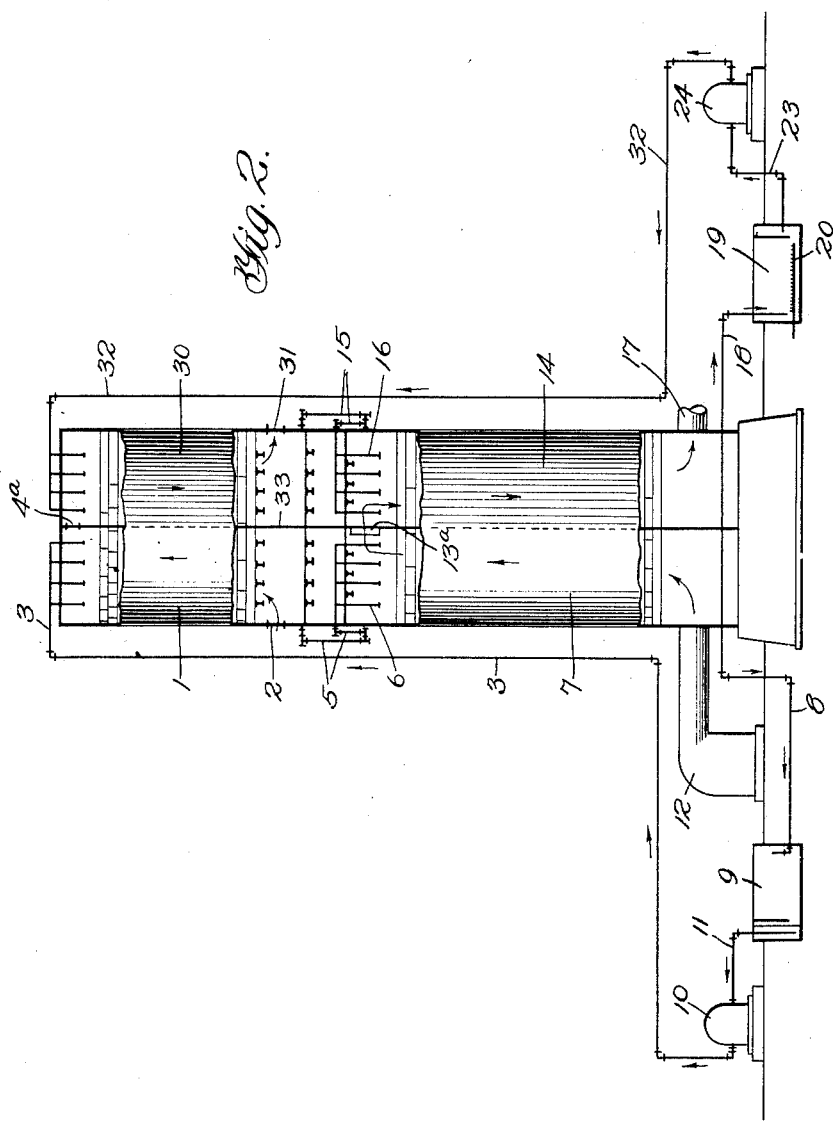

1,690,437

UNITED STATES PATENT OFFICE.

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA.

GAS-PURIFICATION PROCESS AND APPARATUS.

Application filed June 6, 1924, Serial No. 718,254. Renewed January 23, 1928.

This invention relates to processes and apparatus for the purification of gases, of the kind involving the steps of washing the gas with an impurity absorbing liquid, regenerating the liquid by aeration with resulting transfer of the impurities to the air, and purifying the air with a washing liquid, which latter may incidentally be regenerated by the air with separation of the impurities in easily recoverable form.

The invention is more particularly applicable to the elimination of hydrogen sulphide from coal gas and like fuel gases as described in my application filed of even date herewith, Ser. No. 718,253, filed June 6, 1924.

The invention consists broadly in removing the last traces of impurities (for example hydrogen sulphide) from the gas, after the greater portion thereof has already been removed therefrom by a first washing, by subjecting the said gas to a second washing employing freshly regenerated air washing liquid.

As the air washing liquid is but slightly deteriorated by absorbing the traces of impurities remaining in the gas after its first washing, the liquid coming from the second gas washing can conveniently be conveyed directly to the air scrubber and employed therein for washing the air.

The process of the present invention is particularly effective when carried out with a freshly precipitated iron compound as the air purifying agent as described in the above mentioned specification, and a further gain in efficiency can be achieved by employing unidirectional flow of air and washing liquid in the air scrubber in accordance with the invention described in the application of Gilbert Edward Seil, Ser. No. 718,204, filed June 6, 1924, filed of even date herewith.

The invention also consists in providing apparatus for carrying out the new process, comprising means for transferring impurities from the gas to a stream of air in combination with a scrubber for purifying the air, a secondary absorber for removing the last traces of impurities from the gas, and a system for circulating the air washing liquid through the secondary gas absorber and the air scrubber in succession.

The invention further consists in such other new and useful improvements, and has for further objects such other operative advantages or results, as may be found to obtain in the processes and apparatus hereinafter described or claimed.

In order that the invention may be understood, there will now be described by way of example and with reference to the accompanying drawings, a preferred mode of carrying out the process and two arrangements of apparatus with which the process may be carried out, as applied to the elimination of hydrogen sulphide from coal gas.

In these drawings:

Figure 1 is a general elevational view of a complete plant for the elimination of hydrogen sulphide from coal gas.

Figure 2 is a similar view of a modified plant in which all the absorbers and actifiers are combined into a single structure.

In both figures of these drawings similar reference numerals refer to corresponding parts.

In the specific instance now to be described, coal gas is purified from hydrogen sulphide and other acid impurities, employing the special steps described in the other specifications of even date above mentioned. The first washing, by which about 90% of the $H_2S$ is removed, is effected with a solution of sodium carbonate in a scrubber 1 into which the gas enters at the inlet 2, flows upwardly in countercurrent with the washing solution delivered through a pipe 3, and is discharged through the pipe 4. In the scrubber 1 the hydrogen sulphide is transferred to the sodium carbonate solution which flows from the bottom of the scrubber through pipes 5 and a set of sprayers 6 into the top of the actifier 7. The solution falls through the actifier 7 to the bottom thereof and flows off through a pipe 8 into a sump 9 from which it is withdrawn by a pump 10 and pipe 11, and thence recirculated to the top of the absorber. The solution traverses the actifier 7 downwardly in countercurrent with a stream of air supplied by a blower 12, whereby the alkaline solution is regenerated and the hydrogen sulphide transferred to the air. The air leaves the actifier by a pipe 13 and is conveyed to the top of another scrubber or tower 14. In the scrubber 14 the air is washed with a liquid containing an iron compound which is capable of reacting with the hydrogen sulphide with formation of iron sulphide, preferably a dilute solution of sodium carbonate containing ferric carbonate or other iron compond, freshly precipitated as described in my aforesaid application filed of even date herewith. The wash liquid is introduced also at the top of the tower through pipes 15 and sprayers 16 and after traversing the scrubber downwardly, that is in the same direction as the air, it flows off through a pipe 18 into a sump 19. Clean air is discharged through the pipe 17. The liquid is regenerated concurrently with the purification of the air while traversing the scrubber 14 and the regeneration is completed in the sump 19 by means of air jets 20 which also agitate the liquid and mechanically float the sulphur to the surface thereof from which it is readily removed by skimming and then dried in the centrifuge 28.

According to the present invention the partly purified gas discharged from the scrubber 1 is conveyed to the bottom of a second scrubber 30 by means of the pipe 4. In this scrubber 30 the gas is subjected to a second washing by counterflow with fully regenerated air washing liquid from the sump 19 whereby the last traces of hydrogen sulphide are extracted, and the completely purified gas leaves the installation through the pipe 31. The air washing liquid, consisting as already described of a solution of sodium carbonate containing an iron compound in suspension, is pumped from the sum 19 by the pump 24 and through pipes 23, 32, and sprayers, to the top of the absorber 30. After falling through the absorber and absorbing the last traces of H₂S from the gas the liquid enters the pipes 15 and passes into the air scrubber 14 as already described. The air washing liquid thus traverses the second gas scrubber and the air scrubber in series, and being completely regenerated as well as containing freshly precipitated iron compound introduced by means of the feed tank 21, when it enters the second gas scrubber, it has great avidity for hydrogen sulphide and is extremely effective in absorbing the last traces of the same from the gas. The amount of hydrogen sulphide thus absorbed being comparatively small, it does not interfere with the subsequent operation of the liquid in the air scrubber 14.

In the installation shown in Fig. 1 the primary absorber 1 and the actifier 7 are combined into a single tower so organized that the liquid flows by gravity from the upper to the lower compartment in accordance with the invention described in the specification of U. S. Letters Patent No. 1,478,543, Bird, granted to The Koppers Company; also the secondary absorber 30 and the air scrubber 14 are similarly combined into a single tower.

In the modification shown in Fig. 2, all four chambers 1, 7, 14, 30 are combined into a single tower, which is divided by a longitudinal partition 33, the left hand section containing the primary absorber 1 and the actifier 7 while the right hand section contains the secondary absorber 30 and the gas scrubber 14. The gas pipe 4 and the air pipe 13 connecting the two towers of the installation shown in Fig. 1 are eliminated. The gas enters the primary absorber 1 through the inlet 2 at the bottom thereof, flows upwardly through the said absorber, passes into the top of the secondary absorber 30 through an opening 4ᵃ in the partition 33, flows downwardly through this absorber and is discharged at the outlet 31 at the bottom of the secondary absorber 30.

The air enters the actifier 7 at the bottom, flows upwardly, and passes through an opening 13ᵃ provided with an air baffle, into the top of the air scrubber 14, through which it flows downwardly and escapes at the outlet 17.

The sodium carbonate solution from the sump 9 is pumped to the top of the left hand section of the tower and descends through both compartments 1 and 7 in series, while the solution containing the precipitated iron compound from the sump 19 similarly descends through the compartments 30, 14 of the right hand section in series. This arrangement provides a very convenient and compact installation.

The invention as hereinabove set forth or exemplified may be variously practiced or embodied within the scope of the claims hereinafter made.

I claim:

1. A process of the kind referred to for purifying gases, characterized by subjecting the gas, after the greater portion of the impurities have been removed therefrom by a first washing, to a second washing employing freshly regenerated air washing liquid, for the purpose described.

2. A process as claimed in claim 1 in which the air washing liquid is used for the second gas washing and for the air washing in direct succession and in the order stated.

3. A process as claimed in claim 1 applied to the elimination of hydrogen sulphide from coal gas and like fuel gases.

4. A process as claimed in claim 1 applied to the elimination of hydrogen sulphide from coal gas and like fuel gases and in which the liquid employed for the second gas washing and the air washing is a dilute alkaline solution containing a freshly precipitated iron compound.

5. A process as claimed in claim 1, in which the air and the washing liquid for same both traverse the air scrubber in the same direction.

6. A process as claimed in claim 1 applied to the elimination of hydrogen sulphide from coal gas and like fuel gases and in which about 90% of the hydrogen sulphide is absorbed in the first washing with alkaline liquid and the remainder of the hydrogen sulphide absorbed in the second washing with the liquid whereof the primary function is to wash the air.

7. Apparatus for carrying out the process claimed in claim 1, comprising means for transferring impurities from the gas to a stream of air, in combination with a scrubber for purifying the air, a secondary absorber for removing the last traces of impurities from the gas, and a system for circulating the air washing liquid through the secondary gas absorber and the air scrubber in succession.

8. Apparatus as claimed in claim 7, in which the means for transferring impurities from the gas to a stream of air include an absorber and an actifier arranged in superposition in a single tower, and in which the secondary gas absorber and the air scrubber are similarly arranged in a second single tower.

9. A process as claimed in claim 1 applied to the elimination of hydrogen sulphide from coal gas and like fuel gases and in which about ninety per cent of the hydrogen sulphide is absorbed in the first washing with a solution of sodium carbonate and the remainder of the hydrogen sulphide absorbed in the second washing with the liquid whereof the primary function is to wash the air.

In testimony whereof I have hereunto set my hand.

FREDERICK W. SPERR, Jr.